United States Patent [19]

Gallo

[11] Patent Number: 5,597,265
[45] Date of Patent: Jan. 28, 1997

[54] METHOD AND APPARATUS FOR THE IN-SITU TREATMENT OF CONTAMINATION IN SOIL

[76] Inventor: Bruce M. Gallo, 88 Hillside Rd., Chester, N.J. 07930

[21] Appl. No.: 382,133

[22] Filed: Feb. 1, 1995

[51] Int. Cl.⁶ .............................. A62D 3/00; B09C 1/00; B09C 1/08
[52] U.S. Cl. .......................... 405/128; 166/249; 210/170; 210/747; 210/748
[58] Field of Search ..................... 405/128, 52; 210/170, 210/747, 748; 166/249

[56] References Cited

U.S. PATENT DOCUMENTS

| | | | |
|---|---|---|---|
| 5,037,240 | 8/1991 | Sherman | 405/128 |
| 5,054,961 | 10/1991 | Sherman | 405/128 |
| 5,098,538 | 3/1992 | Kim | 204/182.2 |
| 5,120,160 | 6/1992 | Schwengel | 405/128 |
| 5,150,988 | 9/1992 | Powell et al. | 405/128 X |
| 5,286,140 | 2/1994 | Mather | 405/128 |
| 5,370,477 | 12/1994 | Bunin et al. | 405/128 |
| 5,449,249 | 9/1995 | Husten | 405/128 |
| 5,476,992 | 12/1995 | Ho et al. | 405/128 X |

*Primary Examiner*—George A. Suchfield
*Attorney, Agent, or Firm*—Ostrolenk, Faber, Gerb & Soffen, LLP

[57] ABSTRACT

A method and apparatus for the in-situ bio-remediation of contaminated soil and groundwater. Perforated piping embedded within the contaminated region delivers a treatment fluid. The treatment fluid is either a mixture of water, contaminant-eating bacteria and nutrients or a chemical mixture of hydrogen peroxide, a catalyst and water. Ultrasonic or vibratory energy is supplied to the contaminated soil to momentarily increase the permeability thereof. The treatment fluid is then able to flow through the contaminated soil to mix with the contaminants. In one embodiment, an ultrasonic horn located within the perforated piping delivering the treatment solution is used to produce the ultrasonic energy. The ultrasonic horn emits ultrasonic sound waves having a frequency in the range of between 2,000 to 20,000 Hz. In other embodiments, the vibratory energy is emitted by a vibrating plate disposed on a surface of the soil or by a single or plurality of probes embedded within the soil.

9 Claims, 2 Drawing Sheets

METHOD AND APPARATUS FOR THE IN-SITU TREATMENT OF CONTAMINATION IN SOIL

BACKGROUND OF THE INVENTION

1. Field of the Invention

The present invention relates to a method of in-situ bio-remediation or chemical remediation of contaminated soil and groundwater, and more particularly to a method of supplying ultrasonic or vibratory energy to the contaminated soil to aid in the migration of the treatment solution through the soil.

2. Description of the Related Art

It is well known to perform in-situ remediation of contaminated soils utilizing oil eating bacteria. Large cost savings can be realized by remediating soil without having to dig the soil up. For example, U.S. Pat. No. 5,120,160 discloses injecting contamination consuming bacteria and water into the soil to be treated.

One problem with in-situ remediation by conventional methods is that is that it is difficult to ensure that the oil-eating consuming bacteria will reach all of the areas of the contamination because of the varying permeability of the soils encountered. At one extreme is sand, which easily conducts the treatment solution and evenly distributes it. Thus, the solution can easily reach several feet away from the perforated pipe. At the other extreme is clay, which is substantially impermeable, allowing virtually no movement of the solution therethrough. In such a case, bacteria laden water inserted into the ground will not be able to disperse through the clay soil to attack the oil. Most soils, in fact, are a blend between clay and sand, making effective dispersion difficult.

Methods to improve the dispersion of the bacteria include mechanically mixing the soil, as disclosed in U.S. Pat. No. 5,275,513. However, mechanically mixing the soil is expensive, bordering on the old "dig it up" methodology.

Another method to remediate contaminated soil is to extract the contaminants from the soil by electroosmosis. In this method, as disclosed in U.S. Pat. No. 5,240,570, an electric field is applied to the region of the soil being treated and the treatment solution is moved through the soil. However, this technique is complex and requires the presence of groundwater to deliver the bacteria.

U.S. Pat. No. 5,098,538 combines D.C. electrical energy and low frequency acoustic energy to aid in bacteria migration. Although this method is an improvement over electroosmosis, it is expensive and depends on a plurality of different parameters.

None of the prior art methods involve the use of ultrasonic or vibratory energy to aid in bacteria or chemical migration through contaminated soil. Although the use of ultrasonics is known to cavitate soil to prevent the germination of seeds (see, e.g., U.S. Pat. No. 3,902,273), ultrasonic energy has not been previously used for the purpose of increasing the permeability of soil.

Vibratory rollers are commonly used at construction sites to achieve higher soil densities and compaction. The units usually operate at approximately 1750 cycles per second, which appears to be the minimal natural frequency of soil. However, vibratory rollers have not been previously used in combination with fluid delivery for bio-remediation.

SUMMARY OF THE INVENTION

The present invention overcomes the deficiencies of the prior art by providing an apparatus for the in-situ treatment of contaminants from soil comprising means located within the contaminated region for delivery of treatment fluid thereto and means for supplying energy to the contaminated region to momentarily increase the permeability of the contaminated region, thereby facilitating flow of the treatment fluid through the contaminated region and maximizing removal of the contaminants contained therein.

Preferably, the delivery means comprises perforated piping embedded within the contaminated soil; the treatment fluid is a mixture of water, contaminant-eating bacteria and nutrients or a mixture of chemicals; and the energy is ultrasonic or vibratory energy.

Vibratory energy can be supplied by a vibratory plate disposed on a surface of the contaminated soil or by at least one vibratory probe embedded within the contaminated soil.

The ultrasonic energy can be supplied by an ultrasonic horn located within the perforated piping delivering the treatment solution. Ultrasonic sound waves are emitted at a frequency in the range of between 2,000 to 20,000 Hz.

The present invention further comprises a method for the in-situ removal of contaminants from a contaminated region, comprising the steps of delivering treatment solution to the contaminated soil, and supplying ultrasonic or vibratory energy to the contaminated soil to momentarily increase the permeability of the soil, so that the treatment fluid flows therethrough to mix with the contaminants and maximize the removal thereof.

Other features and advantages of the present invention will become apparent from the following description of the invention which refers to the accompanying drawings.

DETAILED DESCRIPTION OF THE PREFERRED EMBODIMENT(S)

Figure 1:
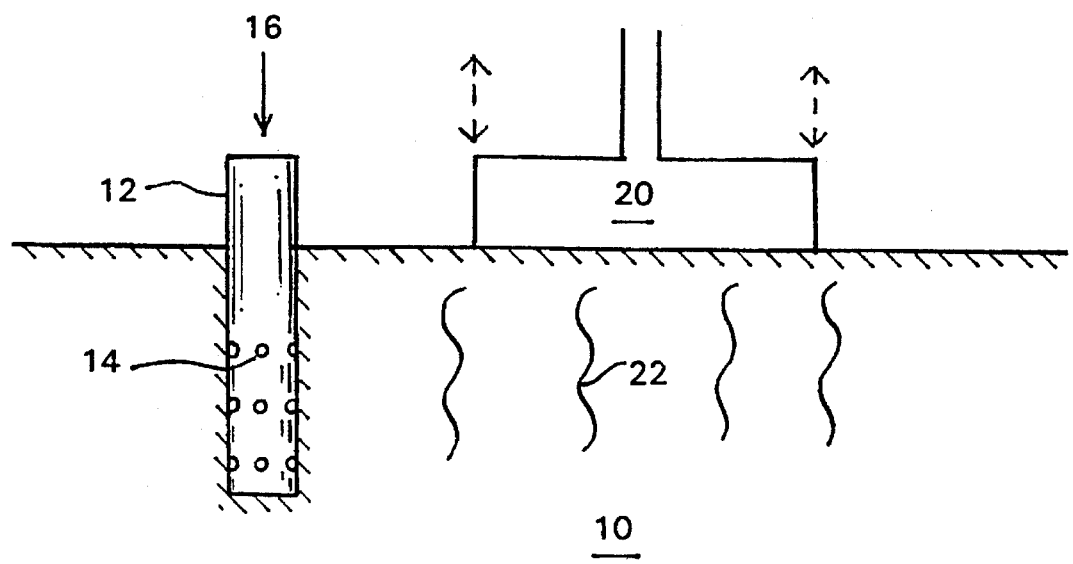
FIG. 1 is a cross-sectional view of the contaminated soil area, treatment fluid delivery pipe, and the vibratory plate of a first embodiment of the present invention.
Figure 2:
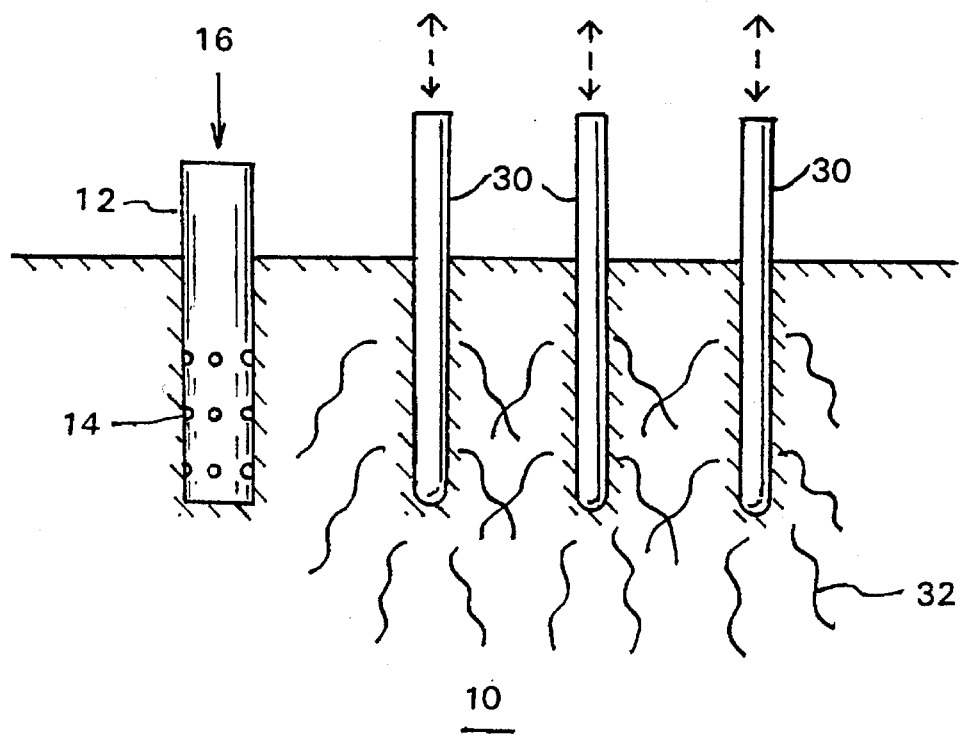
FIG. 2 is a cross-sectional view of the contaminated soil area, treatment fluid delivery pipe, and vibratory probes of a second embodiment of the present invention.
Figure 3:
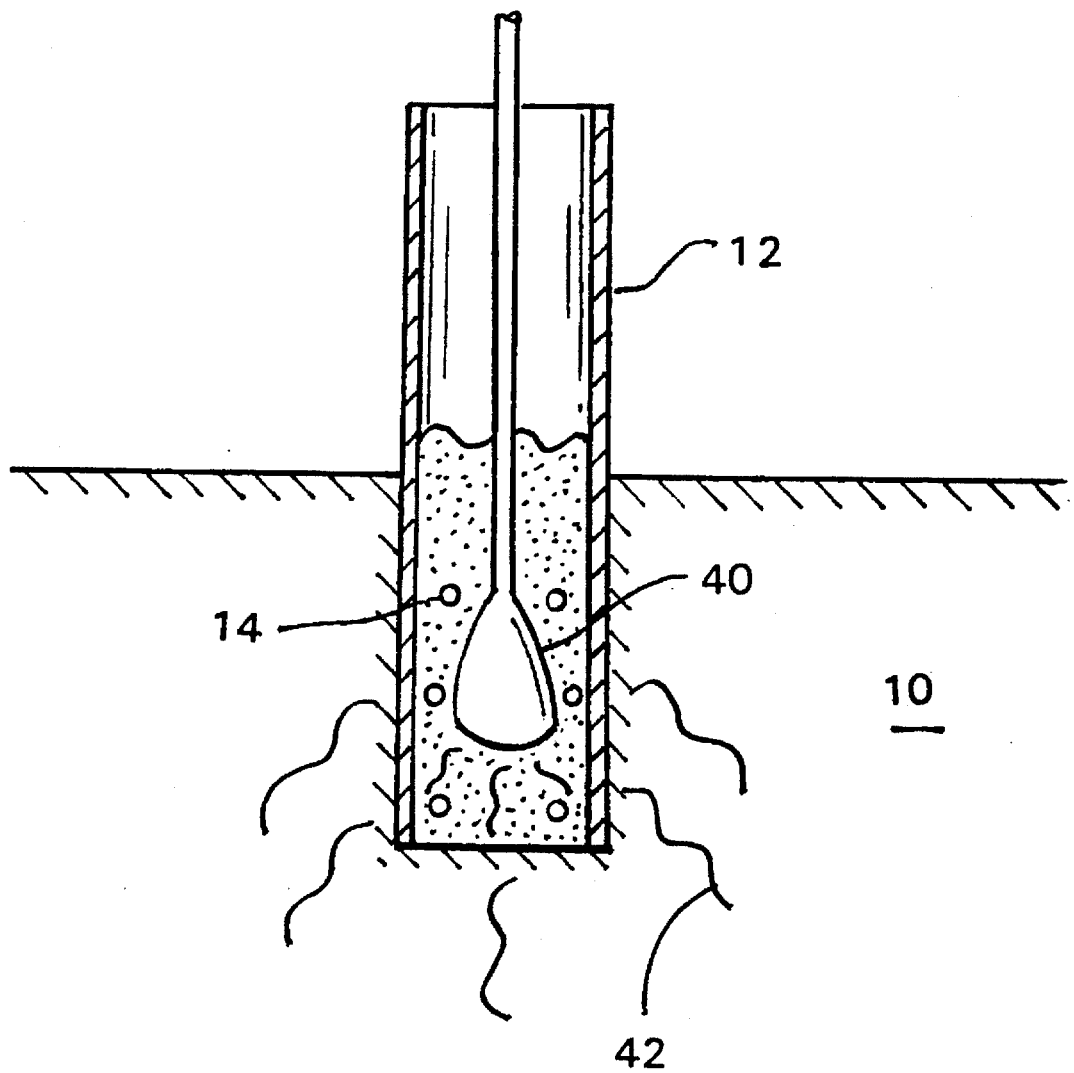
FIG. 3 is a cross-sectional view of the treatment delivery pipe and ultrasonic horn located therein in accordance with a third embodiment of the present invention.

Referring to FIGS. 1–3, in each described embodiment of the present invention, a treatment solution 16 is delivered to the contaminated soil 10 by a pipe 12 embedded in soil 10. The pipe 12 includes a plurality of perforations 14. Advantageously, a plurality of the pipes 12 may be provided in the contaminated soil region. Further, although the invention is described primarily with relation to the remediation of soil, the apparatus and method can be used to remediate ground water and other materials.

The treatment solution may be a mixture of water, contaminant-eating bacteria and nutrients. Alternatively, the treatment solution may be a mixture of chemicals, such as a hydrogen peroxide-catalyst-water mixture. The solution 16 is poured into the pipe 12 and then percolates through the perforations 14 into the soil.

The present invention utilizes vibration or ultrasonic sound waves to excite the soil and momentarily increase its permeability.

Referring now in particular to FIG. 1, in a first embodiment of the invention, a vibratory drum or plate 20 disposed at a surface of the soil 10 is used to supply vibratory energy. The plate can be vibrated by a motor having an eccentric weight.

The alternating compression/vacuum energy waves 22 move through the soil exciting the soil particles, making them move apart, then collide to move apart again, etc. This action temporarily creates a suspension of soil and solution, not unlike quick sand. The exact increase in permeability depends on several factors, soil type, frequency, power applied, etc.

Referring now to FIG. 2, in a second embodiment of the invention, the vibratory energy is provided by a plurality of vibratory probes 30 embedded in the soil 10. The probes 30 can be driven by a pneumatic motor or piston (not shown). The probes 30 emit waves 32 through the soil. The number of probes 30 used depends on the soil type and size of the contamination area. Accordingly, only a single probe 30 may necessary under certain circumstances.

A third embodiment of the invention in shown in FIG. 3. In this embodiment, ultrasonic energy is delivered to the soil 10 by an ultrasonic horn 40 inserted directly into the treatment solution in the perforated pipe 12. The horn 40, driven by an ultrasonic generator (not shown) emits waves 42 to help conduct the fluid through the soil. Ultrasonic sound waves having a frequency in the range of between 2,000 to 20,000 Hz. are optimal for improving soil permeability.

If necessary, the treatment fluid can be removed from the soil using conventional methods and known devices.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus for the in-situ treatment of contaminants from a contaminated region, comprising:

means for delivering treatment fluid to the contaminated region; and an ultrasonic horn located within the means for delivering treatment fluid for supplying ultrasonic soundwaves having a frequency in the range of between 2,000 to 20,000 Hz to the contaminated region to momentarily increase the permeability of the contaminated region, thereby facilitating flow of the treatment fluid through the contaminated region and maximizing removal of the contaminants contained therein.

2. An apparatus for the in-situ treatment of contaminants from a contaminated region, comprising:

means including perforated piping for delivering treatment fluid to the contaminated region; and ultrasonic energy supplying means located within the perforated piping for supplying energy to the contaminated region to momentarily increase the permeability of the contaminated region, thereby facilitating flow of the treatment fluid through the contaminated region and maximizing removal of the contaminants contained therein.

3. A method for the in-situ treatment of contaminants from a contaminated region, comprising the steps of:

delivering a treatment solution to the contaminated region; and supplying ultrasonic sound waves in the frequency range between 2,000 to 20,000 Hz to the contaminated region to momentarily increase the permeability of the contaminated region by exciting particles of the contaminated region so that the treatment fluid flows through the contaminated region to mix with the contaminants and maximize the removal thereof, the ultrasonic waves being supplied by an ultrasonic horn located within the means for delivering treatment solution.

4. The method of claim 3, wherein the treatment fluid comprises a mixture of water, contaminant-eating bacteria, and nutrients.

5. The method of claim 3, wherein the treatment fluid comprises a mixture of hydrogen peroxide, a catalyst and water.

6. The method of claim 3, wherein the contaminated region is contaminated soil.

7. The method of claim 6, wherein the contaminated soil is contaminated with oil and the treatment fluid comprises a mixture of water, oil-eating bacteria and nutrients.

8. The method of claim 6, wherein the contaminated soil is contaminated with oil and the treatment fluid comprises a mixture including hydrogen peroxide, a catalyst and water.

9. The method of claim 3, wherein the treatment solution is delivered by perforated piping embedded within the contaminated region.

\* \* \* \* \*